(12) United States Patent
Mizawa et al.

(10) Patent No.: US 10,402,705 B2
(45) Date of Patent: Sep. 3, 2019

(54) CARD READER

(71) Applicant: NIDEC SANKYO CORPORATION, Suwa-gun, Nagano (JP)

(72) Inventors: Mamoru Mizawa, Nagano (JP); Kazunori Takahashi, Nagano (JP); Toshio Tatai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/204,069

(22) Filed: Nov. 29, 2018

(65) Prior Publication Data
US 2019/0164024 A1 May 30, 2019

(30) Foreign Application Priority Data

Nov. 30, 2017 (JP) ................................. 2017-230248

(51) Int. Cl.
*G06K 7/00* (2006.01)
*G06K 13/08* (2006.01)

(52) U.S. Cl.
CPC ....... *G06K 13/0806* (2013.01); *G06K 13/085* (2013.01)

(58) Field of Classification Search
USPC ................................. 235/379, 449, 475, 486
See application file for complete search history.

(56) References Cited

U.S. PATENT DOCUMENTS

| 6,367,700 B1* | 4/2002 | Kanayama | G06K 7/0021 235/441 |
| 6,616,050 B1* | 9/2003 | Oki | G06K 7/0021 235/441 |
| 2002/0003476 A1* | 1/2002 | Reichardt | G06K 13/08 340/572.1 |
| 2002/0170957 A1* | 11/2002 | May | G06K 7/0004 235/380 |
| 2006/0211288 A1* | 9/2006 | Ishii | G06K 13/08 439/159 |
| 2011/0121078 A1* | 5/2011 | Watanabe | G06K 13/08 235/486 |
| 2011/0240738 A1* | 10/2011 | Mizawa | G06K 13/0887 235/449 |
| 2017/0140178 A1* | 5/2017 | Ishikawa | G06K 13/08 |

FOREIGN PATENT DOCUMENTS

JP 2004341647 A 12/2004

* cited by examiner

*Primary Examiner* — Tuyen K Vo
(74) *Attorney, Agent, or Firm* — Cantor Colburn LLP

(57) ABSTRACT

A card reader may include a card holder and a card ejection mechanism for moving the card holder. The card ejection mechanism includes a connection arm connecting the main body frame with the card holder, a solenoid for bending the connection arm, and an arm urging member urging the connection arm. When the solenoid is switched to a non-energized state, the solenoid pushes the connection arm and the connection arm is changed from an extended posture to a bent posture. The connection arm in the extended posture is restricted from bending to an opposite side to the bent posture side and, in a state that the connection arm is in the extended posture, the arm urging member applies an urging force to the connection arm so that the connection arm is bent to an opposite side to the side of the bent posture.

13 Claims, 6 Drawing Sheets

CARD READER

CROSS REFERENCE TO RELATED APPLICATION

The present application claims priority under 35 U.S.C. § 119 to Japanese Application No. 2017-230248 filed Nov. 30, 2017, the entire content of which is incorporated herein by reference.

FIELD OF THE INVENTION

At least an embodiment of the present invention may relate to a card reader including a card ejection mechanism.

BACKGROUND

A card reader structured to perform reading or writing of data recorded on a card is disclosed in Patent Literature (Japanese Patent Laid-Open No. 2004-341647). The card reader described in the Patent Literature includes a latch mechanism structured to prevent pulling-out of a card. The latch mechanism locks a card by a pawl of a card latch lever protruded to a card insertion port so as not to be pulled out. Therefore, it is difficult to hold an end part of the card by hand for taking it out and thus an automatic ejection mechanism structured to automatically eject the card is provided.

In the automatic ejection mechanism in the Patent Literature, a holding body for holding a card is urged in an ejecting direction by a spring and, when lock by a card latch lever is released, the card is pushed out together with the holding body in the ejecting direction by an urging force of the spring. When a card is to be locked by the card latch lever and, when the lock is to be released, a solenoid is driven for a short time to release engagement of a stopper holding the card latch lever with an engaging part, and the card latch lever is moved by an urging force of an elastic member.

The automatic ejection mechanism in the Patent Literature uses a solenoid as a drive source for performing an ejecting operation for a card. Therefore, when the solenoid is unable to be driven due to a power failure or the like in a state that a card is left in a card reader, the card cannot be ejected automatically and thus the card is required to be ejected manually.

Further, in the Patent Literature, the holding body which holds a card is always urged in an ejecting direction by a spring, and a member for driving a card latch lever is engaged with a stopper and a lock state is formed. Therefore, a card is unable to be held in a case that the card latch lever is not provided.

SUMMARY

In view of the problem described above, at least an embodiment of the present invention may advantageously provide a card reader which is capable of automatically ejecting a card without supplying power and, in addition, capable of holding the card without a member structured to lock the card.

According to at least an embodiment of the present invention, there may be provided a card reader including a card holder structured to hold a card, a main body frame which holds the card holder movable between an insertion waiting position and an insertion completion position, and a card ejection mechanism structured to move the card holder to the insertion waiting position. The card ejection mechanism includes a connection arm which connects the main body frame with the card holder, a solenoid structured to bend the connection arm, and an arm urging member which urges the connection arm. The connection arm is structured of a first arm whose one end is connected with the main body frame and a second arm whose one end is connected with the card holder, and the other end of the first arm and the other end of the second arm are turnably connected with each other. The solenoid directly or indirectly pushes the connection arm when the solenoid is switched from an energized state to a non-energized state and changes the connection arm from an extended posture in a straight line shape corresponding to the insertion completion position to an intermediate posture which is a halfway state changing to a bent posture in a bent shape corresponded to the insertion waiting position. The connection arm in the extended posture is restricted from bending to an opposite side to a side of the bent posture, and the arm urging member applies an urging force to the connection arm so that the connection arm is bent to the side of the bent posture in a state that the connection arm is in the intermediate posture and, in a state that the connection arm is in the extended posture, the arm urging member applies an urging force to the connection arm so that the connection arm is bent to an opposite side to the side of the bent posture.

In at least an embodiment of the present invention, the card ejection mechanism connects the card holder with the main body through the bendable connection arm, and the connection arm is bent to move and eject a card together with the card holder. The connection arm is pushed through an operation when the solenoid of the card ejection mechanism is switched from an energized state to a non-energized state and is bent in a posture which is the halfway state changed from the extended posture (posture at the insertion completion position) to the bent posture (posture when the card has been ejected). As a result, an urging force is applied by the arm urging member to the connection arm so as to further bend to the bent posture side and thus the connection arm is further bent and the card can be ejected. As described above, when a card is automatically ejected by an operation of the solenoid which is switched from an energized state to a non-energized state, in a case that power supply to the solenoid is cut off, the card is always and automatically ejected. Therefore, when a power failure is occurred, a state is avoided that a card is unable to be ejected.

Further, in at least an embodiment of the present invention, the arm urging member restricts the connection arm in the extended posture from bending to an opposite side to the bent posture side and applies an urging force for bending to an opposite side to the bent posture side and holds the extended posture and the card holder is held at the insertion completion position. Therefore, when the connection arm is set in the extended posture, unless the connection arm is urged in a reverse direction by a force exceeding the urging force of the arm urging member, the connection arm is unable to be bent to the bent posture side and thus a card is not ejected. Accordingly, a card can be held without providing an engaging member such as a card latch lever.

In at least an embodiment of the present invention, the solenoid includes a plunger which is movable between a first position where the connection arm is moved to be bent to the side of the bent posture and a second position retreated from the first position and, when the connection arm is in the extended posture, the arm urging member is located on an opposite side to a side where the plunger is located with an arm center line as a reference which passes turning centers of the first arm and the second arm in a connected part of the first arm with the second arm. According to this structure, the solenoid is capable of pushing the connection arm from an opposite side to the arm urging member and thus the connection arm can be bent to the bent posture side against the urging force of the arm urging member. Further, the arm urging member urges the connection arm on an opposite side to the plunger with a bending point of the connection arm (turning center of the arm) as a reference and thus an urging force can be applied to the connection arm for bending to an opposite side to the bending direction by the plunger (bent posture side), and a holding force which holds the connection arm in the extended state can be applied. Therefore, the card holder and a card can be held at the insertion completion position.

In at least an embodiment of the present invention, the arm urging member is a coil spring whose one end is connected with the first arm and the other end is connected with the second arm and, when the connection arm is in the extended posture, a center line of the coil spring is located on the opposite side to the side where the plunger is located with the arm center line as the reference. According to this structure, an urging force for bending to an opposite side to a bending direction by the plunger (bent posture side) can be applied by the coil spring. Therefore, a card can be held at the insertion completion position.

In at least an embodiment of the present invention, the center line of the coil spring is parallel to a moving direction of a card which is moved between the insertion waiting position and the insertion completion position when the connection arm is in the extended posture. According to this structure, it may be structured that, when the connection arm becomes the extended state, an urging force of the coil spring is utilized as a holding force which holds the card holder and a card at the insertion completion position. Further, when the connection arm is bent, the connection arm can be bent by the urging force of the coil spring. Therefore, both of holding of a card at the insertion completion position and ejection of the card can be performed by one coil spring.

In at least an embodiment of the present invention, the card reader includes a card lock mechanism structured to move a card latch lever between a card lock position where the card held by the card holder is locked and a retreated position retreated from the card lock position in cooperation with an operation of the card ejection mechanism. According to this structure, lock release of a card and ejection of the card can be performed in an interlocked manner and thus, in the card reader including the card lock mechanism, lock release of a card and ejection of the card can be automatically performed at a time of a power failure and the like.

For example, it may be structured that the card ejection mechanism includes a turning member which is connected with the plunger and is located at a first turned position when the plunger is located at the first position and at a second turned position when the plunger is located at the second position and, when the turning member is moved to the first turned position from the second turned position, the connection arm is pushed and bent to the side of the bent posture through the turning member, the turning member is provided with a lock part and, at the second turned position, the lock part is located at a lock position where the card latch lever is held at the card lock position and, at the first turned position, the lock part is located at a lock release position retreated from the card latch lever. According to this structure, the connection arm can be pushed in a direction different from a moving direction of the plunger and thus a degree of freedom of arrangement of the solenoid is increased. For example, it may be structured that the solenoid is disposed in parallel to the connection arm and the card latch lever, and the connection arm is pushed in a direction that the connection arm is bent. Therefore, the card ejection mechanism and the card lock mechanism can be provided in a space-saving structure. Further, an eject operation of a card by the connection arm and a lock release operation of the card by the card latch lever can be performed in an interlocked manner by utilizing the turning member.

In at least an embodiment of the present invention, the card reader includes a plunger urging member which urges the plunger to a side of the first position, and the connection arm pushes the plunger to a side of the second position through the turning member when the connection arm is changed from the bent posture to the extended posture. According to this structure, the connection arm is changed in a straight line shape by a force manually pushing a card and, in this case, the plunger can be pushed to the second position side through the connection arm and the turning member. Therefore, when the plunger is attracted to the second position against the urging force of the plunger urging member, a force manually pushing a card inside is utilized as an assist force in addition to the plunger attraction force of the solenoid. Accordingly, even when an attraction force of the solenoid is not sufficient, a card holding state and a card lock state can be attained by moving the plunger and the turning member. Further, in order to increase an attraction force of the solenoid, the size of the solenoid is not required to increase and, alternatively, its stroke is not required to shorten and thus, a degree of freedom of arrangement of the solenoid is increased.

Effects of the Invention

According to at least an embodiment of the present invention, the connection arm connecting the card holder with the main body frame is bent and a card is moved and ejected together with the card holder by bending the connection arm. The connection arm is pushed by an operation when the solenoid of the card ejection mechanism is switched from an energized state to a non-energized state and is bent in a halfway posture which is the halfway state changed from the extended posture (posture at the insertion completion position) to the bent posture (posture when the card has been ejected). As a result, an urging force is applied to the connection arm from the arm urging member so as to further bend to the bent posture side and thus the connection arm is further bent and the card can be ejected. As described above, when a card is automatically ejected by an operation of the solenoid which is switched from an energized state to a non-energized state, in a case that power supply to the solenoid is cut off, the card is always and automatically ejected. Therefore, when a power failure is occurred, a state that a card is unable to be automatically ejected is avoided. Further, the arm urging member restricts the connection arm in the extended posture from bending to an opposite side to the bent posture side and applies an urging force for bending to an opposite side to the bent posture side and holds the extended posture and thus the card holder is held at the insertion completion position. Therefore, when the connection arm is set in the extended posture, unless the connection arm is urged in a reverse direction by a force exceeding the urging force of the arm urging member, the connection arm is unable to be bent to the bent posture side and thus a card is not ejected. Accordingly, a holding force holding the card holder and a card at the insertion completion position can be increased and an unnecessary automatic eject operation due to a mechanical shock or a vibration can be avoided.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1A:
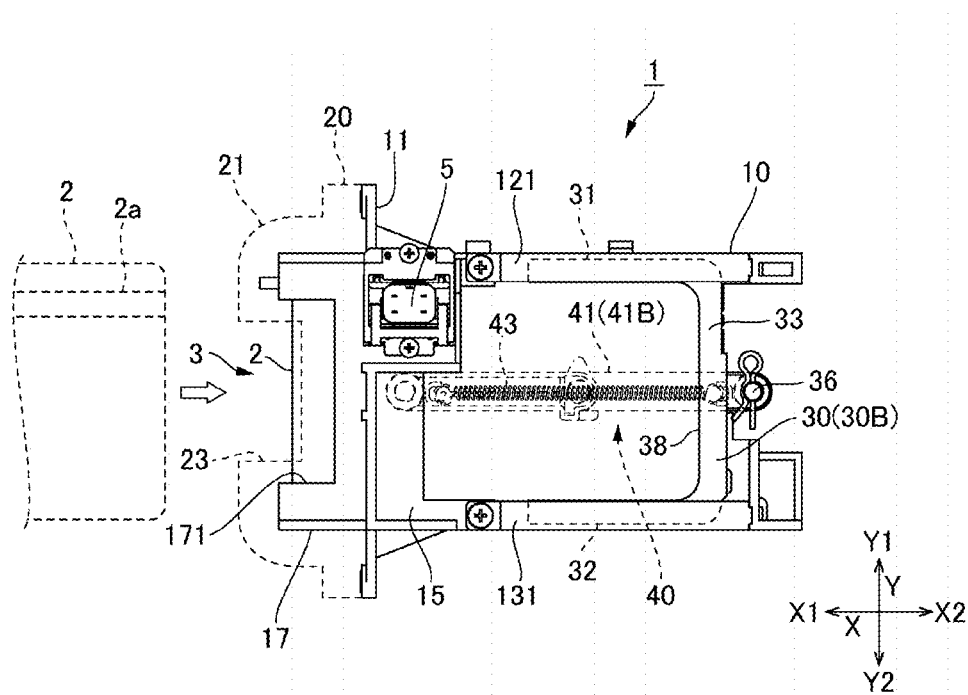
FIG. 1A and FIG. 1B are plan views showing a main part of a card reader in accordance with an embodiment of the present invention which are viewed from a magnetic head side.
Figure 1B:
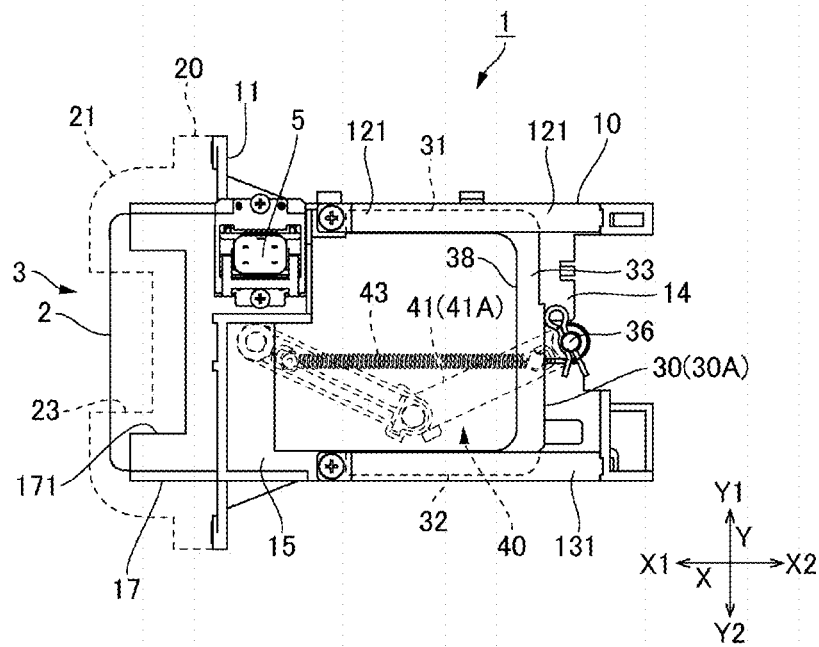
Figure 2A:
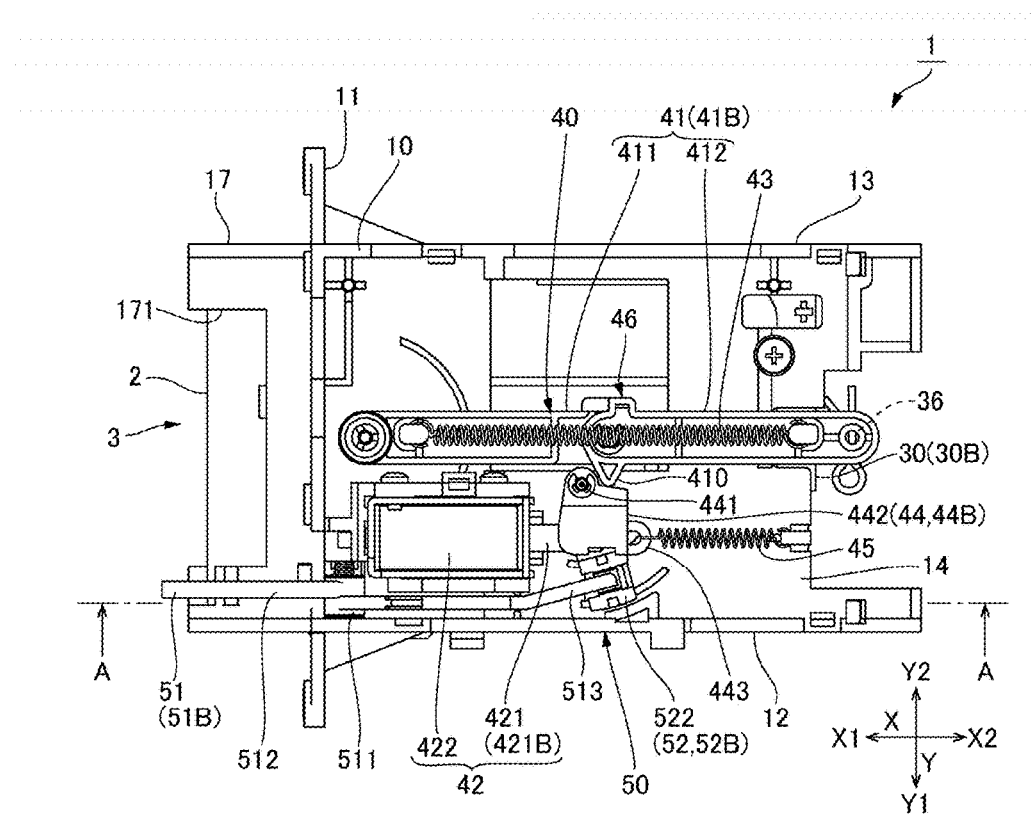
FIG. 2A and FIG. 2B are a plan view and a cross-sectional view showing the main part of the card reader in FIG. 1A and FIG. 1B which are viewed from an opposite side to a magnetic head.
Figure 2B:
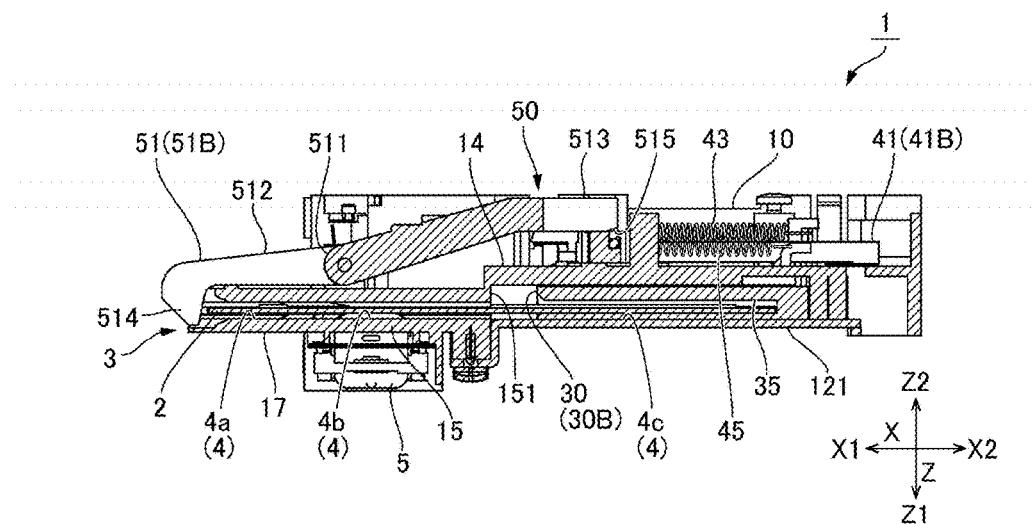
Figure 3A:
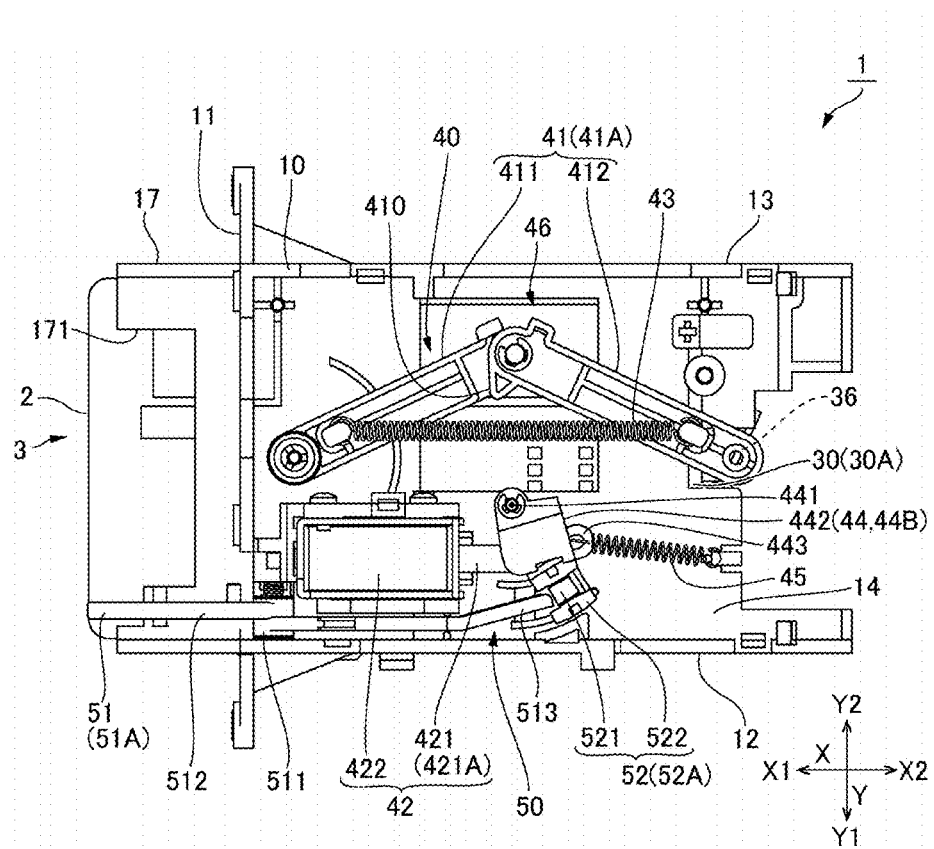
FIG. 3A and FIG. 3B are a plan view and a cross-sectional view showing the main part of the card reader in FIG. 1A and FIG. 1B which are viewed from an opposite side to a magnetic head.
Figure 3B:
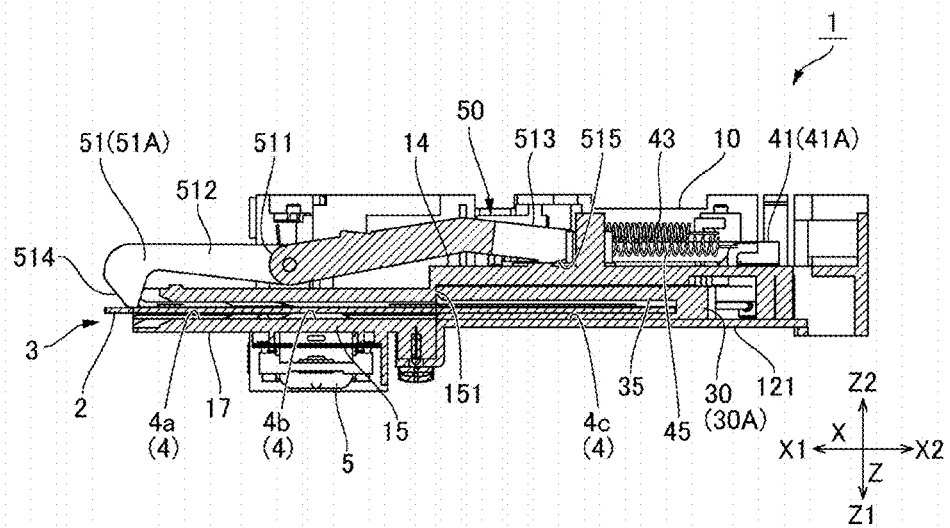

An embodiment of a card reader to which the present invention is applied will be described below with reference to the accompanying drawings. FIG. 1A and FIG. 1B are plan views showing a main part of a card reader 1 in accordance with an embodiment of the present invention which are viewed from a magnetic head 5 side. FIG. 1A shows a state that a card holder is located at an insertion completion position and FIG. 1B shows a state that the card holder is located at an insertion waiting position. FIG. 2A and FIG. 2B and FIG. 3A and FIG. 3B are plan views showing the main part of the card reader 1 in FIG. 1A and FIG. 1B which are viewed from an opposite side to the magnetic head 5 and their cross-sectional views. FIG. 2A and FIG. 2B show states that the card holder is located at the insertion completion position and FIG. 3A and FIG. 3B show states that the card holder is located at the insertion waiting position. FIG. 2A and FIG. 3A are respectively plan views which are viewed from the magnetic head 5 side and FIG. 2B and FIG. 3B are respectively cross-sectional views which are cut at the "A-A" position in FIG. 2A.

(Entire Structure)

As shown in FIG. 1A through FIG. 3B, the card reader 1 is provided with a card insertion port 3 into which a card 2 is inserted. As shown in FIG. 2B and FIG. 3B, an inside of the card reader 1 is formed with a card passage 4 into which a card 2 is inserted through the card insertion port 3. The card 2 is a magnetic card on which magnetic data are recorded. The card reader 1 performs at least one of reading and writing of magnetic data from and on the card 2 when a user inserts the card 2 manually. The card reader 1 includes a magnetic head 5 disposed at a reading/writing position of the card passage 4.

In the present specification, three directions of "X", "Y" and "Z" are directions perpendicular to each other. The "X" direction is a front and rear direction in the card reader 1, and the "X1" direction is a front side and the "X2" direction is a rear side. The card passage 4 is extended in the "X" direction. Further, the "Y" direction is a width direction of the card passage 4, and one side in the "Y" direction is referred to as "Y1" and the other side is referred to as "Y2". The "Z" direction is a thickness direction of a card 2 in the card passage 4, and one side in the "Z" direction is referred to as "Z1" and the other side is referred to as "Z2". A card 2 is provided with a magnetic stripe 2a in which magnetic data are recorded (see FIG. 1A). When a card 2 is inserted into the card passage 4, the magnetic stripe 2a is contacted with the magnetic head 5 and one or both of reading and writing of magnetic data are performed.

The card reader 1 includes a main body frame 10, a front bezel 20 attached to an end part on the front side "X1" of the main body frame 10, a card holder 30 which is supported by the main body frame 10 so as to be movable in the "X" direction, a card ejection mechanism 40 structured to move the card holder 30 to the front side "X1" to eject a card 2, and a card lock mechanism 50 structured to restrict taking-out of the card 2 from the card insertion port 3. In FIG. 2A and FIG. 2B and FIG. 3A and FIG. 3B, the front bezel 20 is not shown.

(Main Body Frame)

As shown in FIG. 1A through FIG. 3B, the main body frame 10 includes a front face frame 11 extended in the "Y" direction, side face frames 12 and 13 which are extended in the "X" direction so as to be substantially parallel to each other at positions separated from each other in the "Y" direction on the rear side "X2" of the front face frame 11, a center frame 14 whose both ends in the "Y" direction are connected with the side face frames 12 and 13, and a magnetic head holding frame 15 which faces the center frame 14 in the "Z" direction. The magnetic head 5 is held by the magnetic head holding frame 15 and faces the card passage 4. End parts on one side "Z1" in the "Z" direction of the side face frames 12 and 13 are attached with holding plates 121 and 131 by which both end parts in the "Y" direction of the card holder 30 are held together with the center frame 14 so as to be movable in the "X" direction (see FIG. 1A and FIG. 1B, FIG. 2B and FIG. 3B).

The main body frame 10 includes a card insertion port forming part 17 which is protruded to the front side "X1" from the front face frame 11. The card insertion port forming part 17 is provided with a cut-out part 171 which is formed so that a center portion in the width direction ("Y" direction) is cut out in a recessed shape to the rear side "X2". The front bezel 20 structuring a front face portion of the card reader 1 is fixed to the front face frame 11. A protruded part 21 which is protruded to the front side "X1" is formed at a substantially center in the "Y" direction of the front bezel 20 and the card insertion port forming part 17 is accommodated in an inside of the protruded part 21. A recessed part 23 which is recessed to the rear side "X2" is formed at a center in the width direction ("Y" direction) of the protruded part 21. When an automatic eject operation described below is performed, a card 2 is ejected to a position where a front end part of the card 2 is capable of being held by hand in the recessed part 23 of the front bezel 20. Therefore, the card 2 can be taken out by hand (see FIG. 1B).

(Card Holder)

As shown in FIG. 2B and FIG. 3B, the card passage 4 includes a first passage portion 4a formed on an inner side of the card insertion port forming part 17, a second passage portion 4b formed between the magnetic head holding frame 15 and the center frame 14, and a third passage portion 4c provided on one side "Z1" in the "Z" direction of the center frame on the rear side "X2" with respect to the magnetic head holding frame 15. The card holder 30 is disposed in the third passage portion 4c. When a card 2 is passed from the second passage portion 4b to the third passage portion 4c, the card 2 is inserted and held by the card holder 30 disposed in the third passage portion 4c.

The card holder 30 is connected with the main body frame 10 by a connection arm 41 which is disposed at a substantially center in the "Y" direction of the main body frame 10. When the card holder 30 is moved to the front side "X1", the connection arm 41 is bent at a substantially center in the "X" direction. A rear end in a moving range in the "X" direction of the card holder 30 is located at a position when the connection arm 41 is extended in a straight line shape in the "X" direction (see FIG. 1A). A control circuit board not shown is fixed to the main body frame 10, and the control circuit board is mounted with a rear sensor (not shown) structured to detect that the card holder 30 has been moved to a predetermined position on a rear side of the main body frame 10. The rear sensor is an optical type sensor which detects that a rib (not shown) formed in the card holder 30 has reached to a position of the rear sensor.

Further, the main body frame 10 further includes a holder position restriction part 151 which faces an end face on the front side "X1" of the card holder 30 in the "X" direction. As shown in FIG. 2B and FIG. 3B, the holder position restriction part 151 is a step part provided in the center frame 14. The card holder 30 is held movable in the "X" direction between an insertion waiting position 30A (see FIG. 1B and FIG. 3B) where the end face on the front side "X1" is abutted with the holder position restriction part 151 and an insertion completion position 30B (see FIG. 1A and FIG. 2B) on the rear side "X2" with respect to the insertion waiting position 30A. The insertion completion position 30B is a position when the connection arm 41 is extended in a straight line shape in the "X" direction, and the insertion waiting position 30A is a position where the connection arm 41 is bent to the other side "Y2" in the "Y" direction.

As shown in FIG. 1A and FIG. 1B, the card holder 30 is provided with a cut-out part 38 which is cut out in a rectangular shape from a center of an end edge on the front side "X1" (in other words, the card insertion port 3 side) toward the rear side "X2" (in other words, in the card inserting direction). The card holder 30 is provided with a first holding part 31 and a second holding part 32, which are extended parallel to the "X" direction on one side "Y1" and the other side "Y2" in the "Y" direction of the cut-out part 38, and a card receiving part 33 extended in the "Y" direction on the rear side "X2" of the cut-out part 38.

The first holding part 31 and the second holding part 32 are formed with card holding grooves 35 which face on an inner side in the width direction ("Y" direction) of the card holder 30 (see FIG. 2B and FIG. 3B). When a card 2 is inserted through the card insertion port 3, both ends in the "Y" direction of the card 2 are inserted into the card holding grooves 35 of the card holder 30 which is disposed in the third passage portion 4c. As shown in FIG. 1B and FIG. 3B, in a state that the card holder 30 is located at the insertion waiting position 30A, the card 2 is inserted to a position where an end face on the rear side "X2" of the card 2 is abutted with the card receiving part 33. In this state, when the card 2 is further inserted, the card holder 30 is pushed by the card 2 and is moved to the rear side "X2" together with the card 2. When the card holder 30 has reached to the insertion completion position 30B, movement to the rear side "X2" of the card holder 30 is restricted by the connection arm 41 in the extended posture 41B.

(Card Ejection Mechanism)

The card ejection mechanism 40 is a mechanism structured to move the card 2 held by the card holder 30 to the front side "X1" together with the card holder 30 and eject to a position where the card 2 is capable of being taken out by hand. The card ejection mechanism 40 includes the connection arm 41 connecting the main body frame 10 with the card holder 30, a solenoid 42 and a coil spring 43 as a drive source for bending the connection arm 41, a turning member 44 connected with a plunger 421 of the solenoid 42, and a plunger return spring 45 which is a plunger urging member for urging the plunger 421 through the turning member 44. The connection arm 41 is disposed at a substantially center in the width direction ("Y" direction) of the main body frame 10 and the card holder 30. Further, the solenoid 42 and the turning member 44 are disposed on one side "Y1" in the "Y" direction with respect to the connection arm 41. The connection arm 41 is changed to a bent posture 41A corresponding to the insertion waiting position 30A of the card holder 30 and to an extended posture 41B corresponding to the insertion completion position 30B.

The solenoid 42 includes a plunger 421 and a solenoid main body 422. The plunger 421 is protruded to the rear side "X2" from the solenoid main body 422. The turning member 44 is turnably connected with the center frame 14 with a support pin 441 as a turning center. The turning member 44 is provided with a turning member main body part 442 with which a tip end of the plunger 421 is turnably connected and a hook part 443 with which the plunger return spring 45 is connected. The support pin 441 is disposed between the plunger 421 and the connection arm 41. Therefore, when the plunger 421 is moved to the rear side "X2", the turning member 44 is turned to the connection arm 41 side (the other side "Y2" in the "Y" direction) with the support pin 441 as a center. On the other hand, when the plunger 421 is moved to the front side "X1", the turning member 44 is turned to a retreated side (one side "Y1" in the "Y" direction) from the connection arm 41 with the support pin 441 as a center.

The plunger return spring 45 is a tension spring and is extended between a rear end of the center frame 14 and the turning member 44. Therefore, the plunger return spring 45 urges the plunger 421 to the rear side "X2". When the solenoid 42 is set in a non-energized state, the plunger 421 is moved to the rear side "X2" by an urging force of the plunger return spring 45 through the turning member 44. Hereinafter, a position of the plunger 421 in a non-energized state (position protruded to the rear side "X2") is referred to as a first position 421A. On the other hand, when the solenoid 42 is set in an energized state, the plunger 421 is attracted to the front side "X1" and pulled into the solenoid main body 422, and the plunger 421 is moved to a second position 421B on the front side "X1" with respect to the first position 421A.

In a state that the plunger 421 is protruded to the first position 421A, the turning member 44 is located at the first turning position 44A where the turning member 44 is turned to the connection arm 41 side (the other side "Y2" in the "Y" direction). On the other hand, in a state that the plunger 421 is attracted to the second position 421B on the front side "X1", the turning member 44 is located at the second turning position 44B where the turning member 44 is turned to a side retreated from the connection arm 41 (one side "Y1" in the "Y" direction). The connection arm 41 is formed with a protruded part 410 which is protruded to a side (one side "Y1" in the "Y" direction) where the turning member 44 and the plunger 421 are disposed. Further, the turning member main body part 442 is formed with an abutting face 444 at a position facing the protruded part 410. Therefore, when the solenoid 42 is set in a non-energized state, the turning member 44 is turned to the connection arm 41 side to push the protruded part 410 by the abutting face 444.

(Automatic Eject Operation)

In the card reader 1, when insertion of a card 2 is completed, the card holder 30 is located at the insertion completion position 30B and the connection arm 41 is in the extended posture 41B which is extended in a straight line shape. Further, the solenoid 42 is in an energized state in which the plunger 421 is held at the second position 421B and the turning member 44 is held at the second turning position 44B. The control part of the card reader 1 supplies an electric current to the solenoid 42 when the rear sensor (not shown) described above detects the card holder 30. The card ejection mechanism 40 performs an automatic eject operation by switching the solenoid 42 from an energized state to a non-energized state based on an instruction from the control part. Further, also in a case that the solenoid 42 is switched from the energized state to the non-energized state due to a power failure or the like, the automatic eject operation is similarly performed.

The connection arm 41 is structured so as to be bendable to an opposite side (the other side "Y2" in the "Y" direction) to a side where the solenoid 42 is disposed, and the protruded part 410 is formed in the vicinity of a bending point of the connection arm 41. Therefore, when the solenoid 42 is set in a non-energized state and the plunger 421 is moved to the first position 421A and the turning member 44 is moved to the first turning position 44A by an urging force of the plunger return spring 45 and the protruded part 410 is pushed by the abutting face 444, the connection arm 41 is changed to an intermediate posture (not shown) in which the connection arm 41 is slightly bent from the extended posture 41B to the other side "Y2" in the "Y" direction. The intermediate posture is a halfway posture changing from the extended posture 41B to the bent posture 41A.

The coil spring 43 is a tension spring which is extended between one end and the other end of the connection arm 41. When the connection arm 41 is bent from the extended posture 41B to the other side "Y2" in the "Y" direction by a predetermined amount based on an operation of the solenoid 42 to become the intermediate posture, the coil spring 43 becomes a state that the coil spring 43 is extended between one end and the other end of the connection arm 41 which is bent. Therefore, the coil spring 43 applies an urging force to the connection arm 41 in a direction that the connection arm 41 is further bent to the bent posture 41A side. In other words, the coil spring 43 functions as an arm urging member which urges the connection arm 41 in a bending direction. The connection arm 41 is further bent by the urging force of the coil spring 43 to be changed to the bent posture 41A. As a result, the card holder 30 is moved to the insertion waiting position 30A. Therefore, the card 2 is ejected.

(Card Holder Holding Structure at Insertion Completion Position)

Figure 4A:
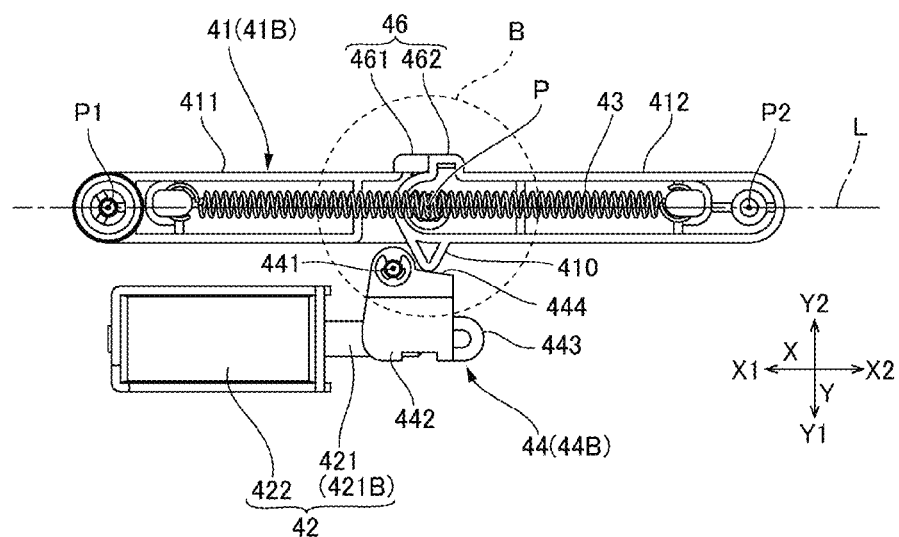
FIG. 4A and FIG. 4B are a plan view and a partial enlarged view showing a main part of a card ejection mechanism.
Figure 4B:
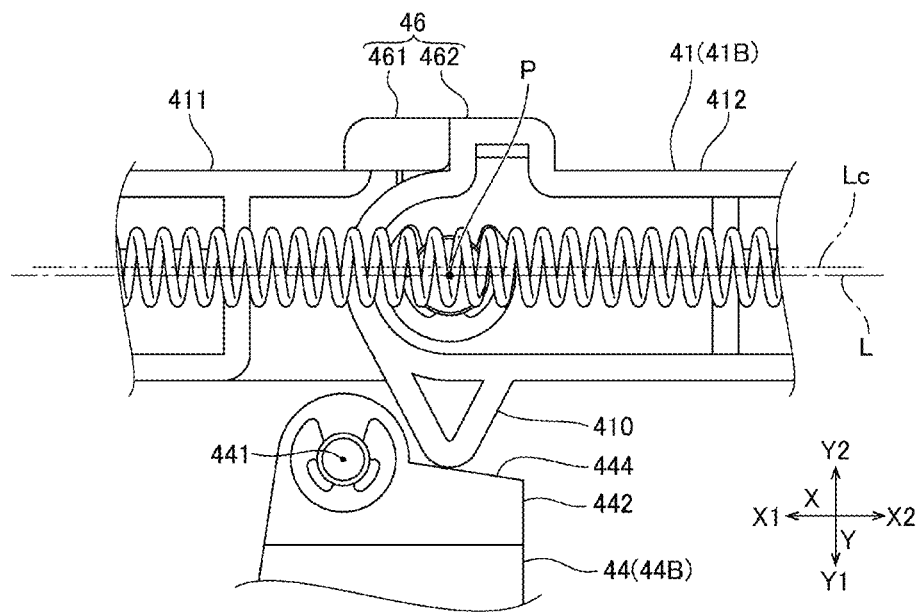

FIG. 4A is a plan view showing a main part of the card ejection mechanism 40 and FIG. 4B is a partial enlarged view showing the region "B" in FIG. 4A. As shown in FIG. 1A through FIG. 4B, the connection arm 41 is structured so that the other end of a first arm 411 whose one end is connected with the main body frame 10 and the other end of a second arm 412 whose one end is connected with the card holder 30 are turnably connected with each other with a turning center "P" as a center. An end part on the front side "X1" of the first arm 411 is turnably connected with the center frame 14 with a turning center "P1" as a center. On the other hand, an end part on the rear side "X2" of the second arm 412 is connected with a support pin 36 provided in an end part on the rear side "X2" of the card holder 30 and is turnable with a turning center "P2" as a center.

The connection arm 41 is structured of the first arm 411 and the second arm 412 which are turnably connected with each other and is capable of being bent with the turning center "P" in the connection part of the both arms as a bending point. The lengths of the first arm 411 and the second arm 412 are substantially equal to each other, and the turning center "P" is located at a substantially center in the "X" direction of the connection arm 41. The intermediate posture and the bent posture 41A of the connection arm 41 are bent postures that the turning center "P" (bending point) is protruded to the other side "Y2" in the "Y" direction.

As shown in FIG. 4A, in the extended posture 41B, an arm center line "L" obtained by connecting the turning center "P1" of an end part on the front side "X1" of the first arm 411 with the turning center "P2" of an end part on the rear side "X2" of the second arm 412 is a straight line parallel to the "X" direction, and the turning center "P" of the both arms in the connected part of the first arm 411 and the second arm 412 is overlapped with the arm center line "L". On the other hand, engaging parts of both ends of the coil spring 43 applies an urging force to the connection arm 41 at a position shifted from the arm center line "L". A center line "Lc" of the coil spring 43 is parallel to the arm center line "L". In other words, the center line "Lc" of the coil spring 43 is parallel to the "X" direction. In this embodiment, the "X" direction is a moving direction (card moving direction) when a card 2 and the card holder 30 are moved between the insertion waiting position 30A and the insertion completion position 30B. Therefore, the center line "Lc" of the coil spring 43 and the arm center line "L" are parallel to the card moving direction.

As shown in a FIG. 4B, the center line "Lc" of the coil spring 43 is shifted from the arm center line "L" in the extended posture 41B, and the center line "Lc" of the coil spring 43 is located on the other side "Y2" in the "Y" direction with respect to the arm center line "L". In other words, in the extended posture 41B, the center line "Lc" of the coil spring 43 is located on an opposite side to the solenoid 42 and the turning member 44 with the arm center line "L" as a reference. Therefore, in the extended posture 41B, the coil spring 43 applies an urging force to the connection arm 41 so as to bend and protrude to one side "Y1" in the "Y" direction. In other words, in the extended posture 41B, the coil spring 43 applies an urging force for bending the connection arm 41 to an opposite side to the bent posture 41A to the connection arm 41.

Although the connection arm 41 is capable of being bent to the bent posture 41A side, bending of the connection arm 41 to an opposite side to the bent posture 41A is restricted. In other words, a bending restriction part 46 is provided in the connection arm 41. The bending restriction part 46 is structured of a first protruded part 461 provided in an end part on the rear side "X2" of the first arm 411 and a second protruded part 462 provided in an end part on the front side "X1" of the second arm 412. The first protruded part 461 and the second protruded part 462 are respectively protruded from edges on the other side "Y2" in the "Y" direction of the first arm 411 and the second arm 412. The first protruded part 461 and the second protruded part 462 are formed at an abutting position in the "X" direction when the connection arm 41 has become the extended posture 41B.

As described above, when the connection arm 41 is in the extended posture 41B, the connection arm 41 is restricted from bending to the bent posture 41A side in a state that an urging force for bending to the opposite side to the bent posture 41A is applied to the connection arm 41 by the coil spring 43. Therefore, when the connection arm 41 is in the extended posture 41B, even if an urging force smaller than the urging force of the coil spring 43 is applied, the connection arm 41 is not bent to the bent posture 41A side and thus the card holder 30 is held at the insertion completion position 30B. In other words, the urging force of the coil spring 43 functions as a holding force which holds the card holder 30 at the insertion completion position 30B.

When an automatic eject operation is to be performed, the card ejection mechanism 40 sets the solenoid 42 in a non-energized state and thus the plunger 421 is pulled out to the rear side "X2" and the turning member 44 is turned by an urging force of the plunger return spring 45, and the protruded part 410 of the connection arm 41 is pushed and the connection arm 41 is bent by the turning member 44. As a result, the connection arm 41 is bent by a predetermined amount to the other side "Y2" in the "Y" direction and becomes the intermediate posture. In this embodiment, in the intermediate posture of the connection arm 41, it is structured that the center line "Lc" of the coil spring 43 is located on the same side (one side "Y1" in the "Y" direction) as the solenoid 42 and the turning member 44 with respect to the turning center "P". Therefore, in the intermediate posture, the urging force of the coil spring 43 is a force pulling both ends of the connection arm 41 on one side "Y1" in the "Y" direction with respect to the turning center "P" and thus, the urging force of the coil spring 43 is applied to the connection arm 41 as an urging force which bends the connection arm 41 to the bent posture 41A side. Therefore, the connection arm 41 is changed to the bent posture 41A.

(Card Lock Mechanism)

The card lock mechanism 50 includes a card latch lever 51 and a lock part 52 structured to hold the card latch lever 51 at a card lock position 51B. The lock part 52 is provided in the turning member 44 of the card ejection mechanism 40. As shown in FIG. 2A and FIG. 3A, the card latch lever 51 is disposed in a space between the solenoid 42 and the side face frame 12. The card latch lever 51 is turnable around a rotation axial line extended in the "Y" direction with a shaft part 511 provided in a corner part where the front face frame 11 and the side face frame 12 are crossed as a center. The card latch lever 51 is provided with a card engaging part 512 extended to the front side "X1" from the shaft part 511 and an operation part 513 extended to the rear side "X2" from the shaft part 511.

Figure 5A:
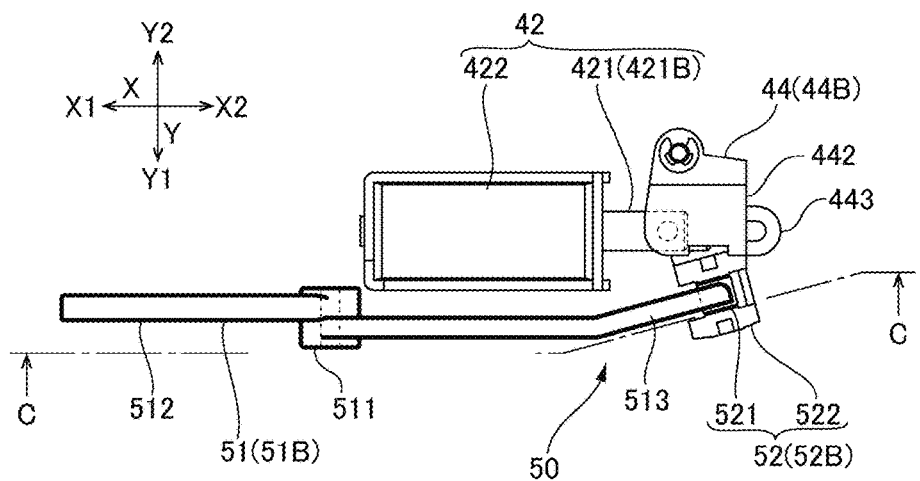
FIG. 5A and FIG. 5B are explanatory views showing an operation of a card lock mechanism (lock state).
Figure 5B:
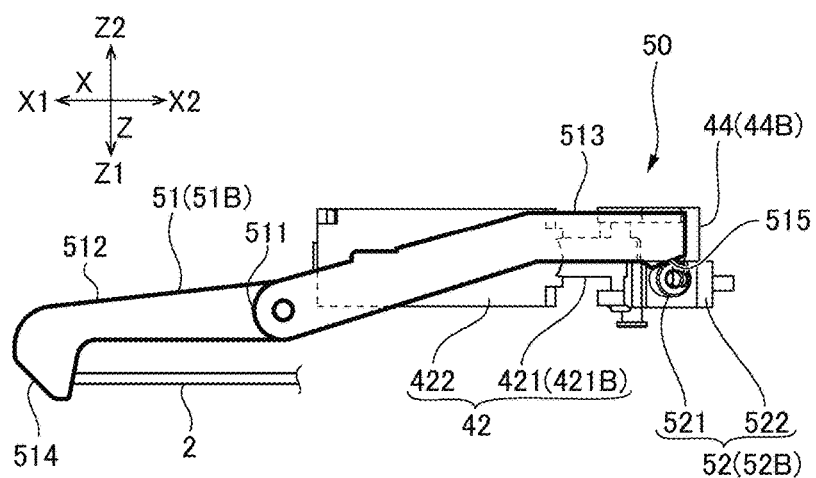
Figure 6A:
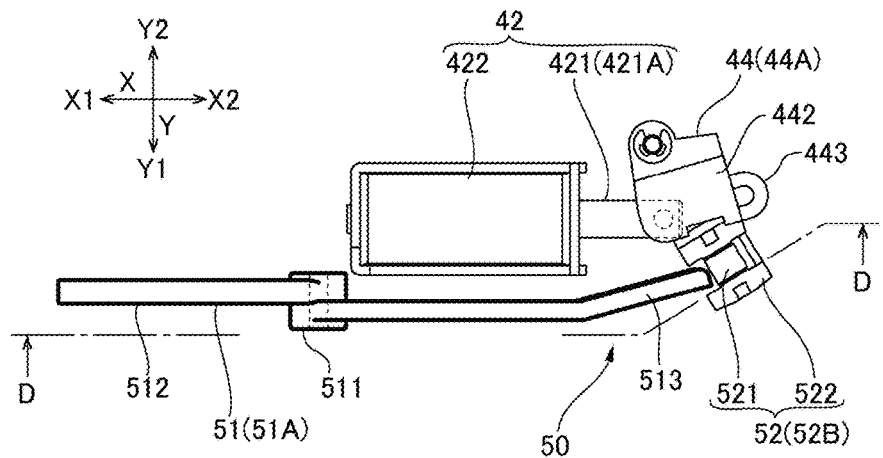
FIG. 6A and FIG. 6B are explanatory views showing an operation of a card lock mechanism (lock released state).
Figure 6B:
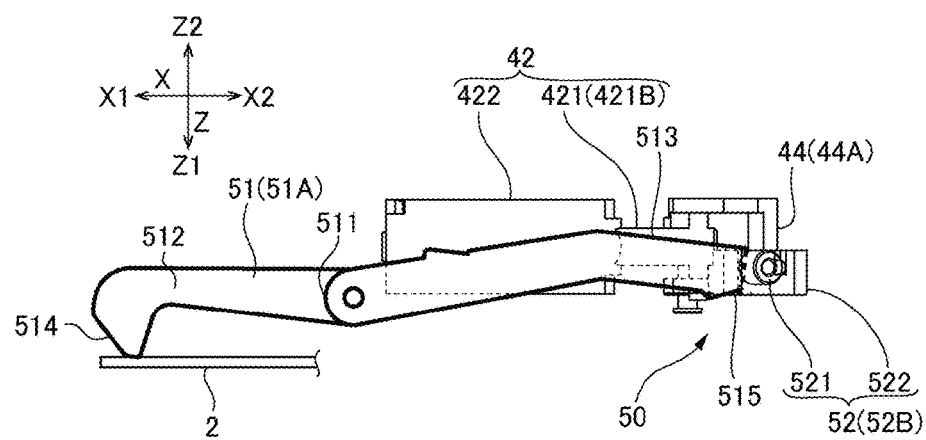

FIG. 5A and FIG. 5B and FIG. 6A and FIG. 6B are explanatory views showing an operation of the card lock mechanism 50 and are plan views and side views showing the solenoid 42, the turning member 44 and the card latch lever 51. FIG. 5A and FIG. 5B show a lock state that a card 2 is locked and FIG. 6A and FIG. 6B show a lock released state that the card 2 is not locked. Further, FIG. 5A and FIG. 6A are plan views, FIG. 5B is a side view which is viewed from the "C-C" position in FIG. 5A, and FIG. 6B is a side view which is viewed from the "D-D" position in FIG. 6A. The card latch lever 51 is movable between a card lock position 51B (see FIG. 2B and FIG. 5B) at which a pawl part 514 provided at a tip end of the card engaging part 512 is protruded to a position locking a tip end of a card 2 and a retreated position 51A (see FIG. 3B and FIG. 6B) at which the pawl part 514 is retreated to a position where the pawl part 514 is not interfered with an insertion path of the card 2.

The lock part 52 is provided on one side "Y1" in the "Y" direction of the turning member main body part 442 with which the plunger 421 is connected, and is turnable together with the turning member main body part 442 with the support pin 441 as a center. The lock part 52 includes a roller 521 in a cylindrical tube shape and a roller support part 522 which turnably supports the roller 521. The lock part 52 is structured so that, when the turning member 44 is turned between the first turned position 44A and the second turned position 44B with the support pin 441 as a center, the lock part 52 is moved between a lock release position 52A where the roller 521 is escaped from a lower side of the operation part 513 and a lock position 52B where the roller 521 is entered to the lower side of the operation part 513 of the card latch lever 51. The operation part 513 of the card latch lever 51 is formed with an inclined face 515 configured to contact with the roller 521. When a card 2 is to be locked by the card lock mechanism 50, the roller 521 is rolled while pushing the inclined face 515 to push up the operation part 513 of the card latch lever 51.

As shown in FIG. 5A and FIG. 5B, when the turning member 44 is located at the second turned position 44B, the lock part 52 is located at the lock position 52B. In this case, the operation part 513 of the card latch lever 51 is lifted in a direction separated from the center frame 14 (the other side "Z2" in the "Z" direction) by the roller 521 and the card engaging part 512 is moved downward in an opposite direction to the operation part 513 and a card 2 is locked by the pawl part 514 and thus, the card 2 is unable to be ejected. Further, as shown in FIG. 6A and FIG. 6B, when the turning member 44 is located at the first turned position 44A, the lock part 52 is located at the lock release position 52A. In this case, the roller 521 is disengaged from the operation part 513 of the card latch lever 51 and the operation part 513 is moved downward to one side "Z1" in the "Z" direction and thus, the card engaging part 512 is lifted to the other side in the "Z" direction and the pawl part 514 is retreated from the front side "X1" of the card 2. Therefore, the card 2 can be ejected.

(Card Lock Operation and Lock Release Operation)

The card lock mechanism 50 is structured so that the card lock mechanism 50 operates in cooperation with the card ejection mechanism 40 and, when a card 2 is inserted, the card lock mechanism 50 is switched to the card lock state. An operation of the card lock mechanism 50 is performed as follows. First, a card 2 is inserted into the card insertion port 3 and the card 2 is abutted with the card receiving part 33 at the rear end of the card holder 30 and the card holder 30 is pushed to the rear side "X2" together with the card 2.

As described above, the control part of the card reader 1 monitors a position of the card holder 30 by the rear sensor (not shown) disposed at a position on the rear end side of the main body frame 10. When it is detected by the rear sensor that a user has manually pushed the card holder 30 to a predetermined position, an electric current is supplied to the solenoid 42 and the plunger 421 is pulled to the second position 421B side by a plunger attraction force of the solenoid 42 and the turning member 44 is going to be turned from the first turned position 44A to the second turned position 44B. In this case, in the card ejection mechanism 40, the connection arm 41 is transformed in a straight line shape by a force of a user manually pushing a card 2 against an urging force of the coil spring 43 and thus, the protruded part 410 of the connection arm 41 pushes the abutting face 444 of the turning member 44 and applies a turning force for turning the turning member 44 from the first turned position 44A to the second turned position 44B side. In other words, the turning member 44 receives both of a plunger attraction force of the solenoid 42 and a force of a user pushing the card 2 inside, and the turning member 44 is turned from the first turned position 44A to the second turned position 44B.

When the turning member 44 is moved to the second turned position 44B, the lock part 52 is moved to the lock position 52B. As a result, the roller 521 of the lock part 52 pushes the operation part 513 of the card latch lever 51 upward to the other side "Z2" in the "Z" direction and the card latch lever 51 is moved to the card lock position 51B. Therefore, the card 2 is locked by the pawl part 514 of the card latch lever 51 and thus the card 2 is unable to be taken out. While the card holder 30 is held at the insertion completion position 30B, the lock part 52 is not retreated from the lock position 52B and thus the card latch lever 51 is held at the card lock position 51B and a lock state of the card 2 is maintained.

When an automatic eject operation is to be performed, the card lock mechanism 50 performs a lock release operation of a card 2 in cooperation with the card ejection mechanism 40. As described above, in an automatic eject operation, the solenoid 42 is switched to a non-energized state and thus, the plunger 421 is protruded to the rear side "X2" and the turning member 44 is turned from the second turned position 44B to the first turned position 44A. In this case, the lock part 52 is moved from the lock position 52B to the lock release position 52A and thus the roller 521 is retreated to the rear side "X2" and the card latch lever 51 is turned in a direction so that the operation part 513 is moved downward to one side "Z1" in the "Z" direction and is moved to the retreated position 51A. Therefore, the card 2 can be taken out. When lock of the card 2 has been released, the card lock mechanism 50 maintains the released state until another card 2 is inserted and the connection arm 41 of the card ejection mechanism 40 is extended again.

(Conditions for Performing Operation of Card Ejection Mechanism)

When a card 2 is inserted into the card reader 1, the card ejection mechanism 40 turns the turning member 44 from the first turned position 44A to the second turned position 44 B side against an urging force "FB" of the plunger return spring 45. In this case, as described above, the turning member 44 receives, in addition to a plunger attraction force "F" of the solenoid 42, a pressing force of the protruded part 410 of the connection arm 41 which pushes the abutting face 444 of the turning member 44 when a user has been pushing the card 2 and, in this manner, the turning member 44 is turned. In other words, a pressing force caused by a force that a user pushes a card 2 is utilized as an assist force "FA" for moving the plunger 421 to the second position 421B (pulling-in position). In a case that the assist force "FA" is not utilized, if the plunger attraction force "F" of the solenoid 42 is not larger than the urging force "FB" of the plunger return spring 45, the plunger 421 cannot be pulled inside and thus the turning member 44 cannot be turned. In this embodiment, the assist force "FA" is added by a user so as to satisfy the conditional expression of "FA+F>FB" and thus the plunger 421 can be pulled inside and the turning member 44 can be moved to the second turned position 44B. In other words, even when a magnitude relationship between the plunger attraction force "F" and the urging force "FB" of the plunger return spring 45 satisfies "F<FB", the card ejection mechanism 40 is capable of being operated.

When the card holder 30 has been pushed to the insertion completion position 30B, as described above, the coil spring 43 which urges the connection arm 41 is moved to an opposite side to the turning member 44 and the solenoid 42 with respect to the turning center "P" which is a bending point of the connection arm 41, and the urging force of the coil spring 43 holds the connection arm 41 in the extended posture 41B and functions as a card holding force "FC" which holds the card holder 30 at the insertion completion position 30B. Therefore, even in a structure that a magnitude relationship between the plunger attraction force "F" and the urging force "FB" of the plunger return spring 45 is set to be "F<FB", when the conditional expression of "FC+F>FB" is satisfied, the card holder 30 can be held at the insertion completion position 30B. Further, when a card 2 is to be ejected, energization of the solenoid 42 is cut off and the plunger attraction force "F" is vanished. In this case, when the card holding force "FC" and the urging force "FB" of the plunger return spring 45 satisfies the conditional expression of "FB>FC", the automatic eject operation described above can be performed.

As described above, in this embodiment, a necessary condition of an operation of the card ejection mechanism 40 is that the plunger attraction force "F", the assist force "FA" by a user pushing a card 2, the urging force "FB" of the plunger return spring 45, and the card holding force "FC" by the coil spring 43 satisfy the following conditional expression (1):

$$\text{``}F+FA\text{''}>\text{``}FB\text{''}>\text{``}FC\text{''} \qquad (1)$$

Principal Effects in this Embodiment

As described above, the card reader 1 in this embodiment includes the card ejection mechanism 40 structured to eject a card 2 through the card holder 30. In the card ejection mechanism 40, the card holder 30 and the main body flame 10 are connected with each other through the connection arm 41 which is bendable, and the card holder 30 is moved to the insertion waiting position 30A by bending the connection arm 41 and the card 2 is ejected. The connection arm 41 is bent to the intermediate posture which is the halfway state changed to a posture of the card ejection state (bent posture 41A in a bent shape) by an operation of the plunger 421 when the solenoid 42 of the card ejection mechanism 40 is switched from an energized state to a non-energized state. As a result, an urging force of the coil spring 43 (arm urging member) is applied to the connection arm 41 so as to further bend to the bent posture 41A side and thus the connection arm 41 is further bent and the card 2 is ejected. As described above, when ejection of a card 2 is automatically performed based on an operation of the solenoid 42 which is switched from an energized state to a non-energized state, in a case that power supply to the solenoid 42 is cut off, the card 2 is always and automatically ejected. Therefore, when a power failure is occurred, a state that a card 2 is unable to be ejected is avoided.

Further, in this embodiment, the coil spring 43 applies an urging force for bending the connection arm 41 to an opposite side to the bent posture 41A side in a state that the card holder 30 is located at the insertion completion position 30B (in other words, the connection arm 41 is reached to the extended posture 41B). In other words, when the connection arm 41 is located in the extended posture 41B, the center line "Lc" of the coil spring 43 is located at a position shifted from the arm center line "L" passing through the turning center "P" of the first arm 411 and the second arm 412, and the center line "Lc" of the coil spring 43 is located on an opposite side to side where the plunger 421 is located with the arm center line "L" as a reference. Further, the center line "Lc" of the coil spring 43 is parallel to the "X" direction which is a moving direction of a card and the card holder 30. Further, the connection arm 41 is restricted from bending to an opposite side to the bent posture 41A side. Therefore, the connection arm 41 can be held in the extended posture 41B by an urging force of the coil spring 43, and the card holder 30 and a card 2 can be held at the insertion completion position 30B. Accordingly, even when a card 2 is not locked by the card latch lever 51, the card 2 can be held.

In this embodiment, when the connection arm 41 is located in the extended posture 41B, the center line "Lc" of the coil spring 43 is located on an opposite side to a side where the plunger 421 is located with the arm center line "L" as a reference. Therefore, the plunger 421 is capable of pushing the connection arm 41 from an opposite side to the coil spring 43 and thus the connection arm 41 is pushed by a force larger than an urging force of the coil spring 43 and the connection arm 41 can be bent to the side of the bent posture 41A. Further, when the connection arm 41 is bent to a position (intermediate position) where the turning center "P" has exceeded the center line "Lc" of the coil spring 43 by the pressing force of the plunger 421, the connection arm 41 is changed to the bent posture 41A by the urging force of the coil spring 43. In other words, in this embodiment, both of holding of a card 2 and the card holder 30 at the insertion completion position 30B and ejection of the card 2 and the card holder 30 can be performed by the urging force of one coil spring 43.

In this embodiment, the card latch lever 51 is moved to the card lock position 51B and the retreated position 51A in cooperation with an operation of the card ejection mechanism 40 and thereby a lock operation and a lock release operation of a card 2 are performed by the card lock mechanism 50. Therefore, when insertion of a card 2 is completed, a lock state of the card 2 can be attained automatically. Further, at the time of a power failure and the like, lock release and ejection of the card 2 can be performed automatically.

The card ejection mechanism 40 in this embodiment includes the turning member 44 connected with the plunger 421 and the connection arm 41 is indirectly pushed and bent through the turning member 44. Therefore, the connection arm 41 can be pushed in a direction different from a moving direction of the plunger 421 and thus a degree of freedom of arrangement of the solenoid 42 is increased. For example, in this embodiment, the solenoid 42 can be disposed in parallel to the connection arm 41 and the card latch lever 51. Therefore, the card ejection mechanism 40 and the card lock mechanism 50 can be structured compactly. Further, an eject operation of a card 2 by the connection arm 41 and a lock release operation of the card 2 by the card latch lever 51 can be performed in an interlocked manner by utilizing the turning member 44.

The card ejection mechanism 40 in this embodiment includes the plunger return spring 45 (plunger urging member) which urges the plunger 421 to a side of the first position 421A and, when the connection arm 41 is changed from the bent posture 41A to the extended posture 41B, the plunger 421 is pushed to a side of the second position 421B through the turning member 44. According to this structure, when the connection arm 41 is to be transformed in a straight line shape by a force manually pushing a card 2, the plunger 421 can be pushed to the second position 421B side through the connection arm 41 and the turning member 44. As a result, when the plunger 421 is to be attracted to the second position 421B against an urging force of the plunger return spring 45, a force manually pushing a card 2 can be utilized as an assist force "FA" in addition to the plunger attraction force of the solenoid 42. Therefore, even when a plunger attraction force of the solenoid 42 is not sufficient, the plunger 421 and the turning member 44 can be moved to attain a lock state.

Generally, a plunger attraction force of the solenoid 42 becomes smaller as a stroke of the solenoid 42 becomes larger. Therefore, in a case that a plunger attraction force of the solenoid 42 is required to be secured, a plunger attraction force may be insufficient in a structure that the plunger 421 is attracted from a position where a stroke is large. However, according to this embodiment, a force manually pushing a card 2 is utilized as an assist force "FA" and thus the solenoid 42 is not required to use at a position where a stroke is small in order to secure a plunger attraction force. Therefore, a degree of freedom of arrangement of the solenoid 42 is high. Further, the size of the solenoid 42 is not required to increase for increasing a plunger attraction force of the solenoid 42.

Modified Embodiments

In the embodiment described above, the card holder 30 and a card 2 can be held by an urging force of the coil spring 43. Therefore, even when a card 2 is not locked by the card latch lever 51, the card holder 30 and the card 2 can be held at the insertion completion position 30B. In other words, the present invention may be applied to a structure that no card lock mechanism 50 is provided.

In the embodiment described above, a straight moving operation of the solenoid 42 is converted to a turning operation of the turning member 44, and the solenoid 42 is interlocked with the connection arm 41 and the card latch lever 51 through the turning member 44. However, a member interposed between the solenoid 42 and the connection arm 41 and the card latch lever 51 may be a structure different from the turning member 44. Further, it may be structured that the connection arm 41 is directly driven by an operation of the solenoid 42.

The card reader 1 in the embodiment described above includes the magnetic head 5 and a card 2 is provided with a magnetic stripe 2a. However, the card 2 may be provided with an IC chip. In this case, it may be structured that the card reader 1 includes an IC contact block structured to perform reading and writing of data from and to an IC chip instead of the magnetic head 5 or, in addition to the magnetic head 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader comprising:
   a card holder structured to hold the card;
   a main body frame which holds the card holder movable between an insertion waiting position and an insertion completion position; and
   a card ejection mechanism structured to move the card holder to the insertion waiting position;
   wherein the card ejection mechanism comprises:
   a connection arm which connects the main body frame with the card holder;
   a solenoid structured to bend the connection arm; and
   an arm urging member structured to urge the connection arm;
   wherein the connection arm comprises a first arm having a first end connected with the main body frame and a second arm having a first end connected with the card holder, and a second end of the first arm and a second end of the second arm are turnably connected;
   wherein the solenoid is structured to directly or indirectly push the connection arm when the solenoid is switched from an energized state to a non-energized state and changes the connection arm from an extended posture in a straight line shape corresponding to the insertion completion position to an intermediate posture which is a halfway state changing to a bent posture in a bent shape corresponded to the insertion waiting position;
   wherein the connection arm in the extended posture is restricted from bending to an opposite side to a side of the bent posture; and
   wherein the arm urging member applies an urging force to the connection arm so that the connection arm is bent to the side of the bent posture in a state that the connection arm is in the intermediate posture and, in a state that the connection arm is in the extended posture, the arm urging member applies an urging force to the connection arm so that the connection arm is bent to an opposite side to the side of the bent posture.

2. The card reader according to claim 1, wherein
   the solenoid comprises a plunger which is movable between a first position where the connection arm is moved to be bent to the side of the bent posture and a second position retreated from the first position, and
   when the connection arm is in the extended posture, the arm urging member is located on an opposite side to a side where the plunger is located with an arm center line as a reference which passes turning centers of the first arm and the second arm in a connected part of the first arm with the second arm.

3. The card reader according to claim 2, wherein
   the arm urging member is a coil spring whose one end is connected with the first arm and an other end is connected with the second arm, and
   when the connection arm is in the extended posture, a center line of the coil spring is located on the opposite side to the side where the plunger is located with the arm center line as the reference.

4. The card reader according to claim 3, wherein the center line of the coil spring is parallel to a moving direction of a card which is moved between the insertion waiting position and the insertion completion position when the connection arm is in the extended posture.

5. The card reader according to claim 4, further comprising a card lock mechanism structured to move a card latch lever between a card lock position where the card held by the card holder is locked and a retreated position retreated from the card lock position in cooperation with an operation of the card ejection mechanism.

6. The card reader according to claim 5, wherein
   the card ejection mechanism comprises a turning member which is connected with the plunger and is located at a first turned position when the plunger is located at the first position and at a second turned position when the plunger is located at the second position,
   when the turning member is moved to the first turned position from the second turned position, the connection arm is pushed and bent to the side of the bent posture through the turning member,
   the turning member comprises a lock part, and
   at the second turned position, the lock part is located at a lock position where the card latch lever is held at the card lock position and, at the first turned position, the lock part is located at a lock release position retreated from the card latch lever.

7. The card reader according to claim 6, further comprising a plunger urging member which urges the plunger to a side of the first position,
   wherein the connection arm pushes the plunger to a side of the second position through the turning member when the connection arm is changed from the bent posture to the extended posture.

8. The card reader according to claim 3, further comprising a card lock mechanism structured to move a card latch lever between a card lock position where the card held by the card holder is locked and a retreated position retreated from the card lock position in cooperation with an operation of the card ejection mechanism.

9. The card reader according to claim 8, wherein
   the card ejection mechanism comprises a turning member which is connected with the plunger and is located at a first turned position when the plunger is located at the first position and at a second turned position when the plunger is located at the second position,
   when the turning member is moved to the first turned position from the second turned position, the connection arm is pushed and bent to the side of the bent posture through the turning member,
   the turning member comprises a lock part, and
   at the second turned position, the lock part is located at a lock position where the card latch lever is held at the card lock position and, at the first turned position, the lock part is located at a lock release position retreated from the card latch lever.

10. The card reader according to claim 9, further comprising a plunger urging member which urges the plunger to a side of the first position,
    wherein the connection arm pushes the plunger to a side of the second position through the turning member when the connection arm is changed from the bent posture to the extended posture.

11. The card reader according to claim 2, further comprising a card lock mechanism structured to move a card latch lever between a card lock position where the card held by the card holder is locked and a retreated position retreated from the card lock position in cooperation with an operation of the card ejection mechanism.

12. The card reader according to claim 11, wherein
    the card ejection mechanism comprises a turning member which is connected with the plunger and is located at a first turned position when the plunger is located at the first position and at a second turned position when the plunger is located at the second position, when the turning member is moved to the first turned position from the second turned position, the connection arm is pushed and bent to the side of the bent posture through the turning member, the turning member comprises a lock part, and at the second turned position, the lock part is located at a lock position where the card latch lever is held at the card lock position and, at the first turned position, the lock part is located at a lock release position retreated from the card latch lever.

13. The card reader according to claim 12, further comprising a plunger urging member which urges the plunger to a side of the first position, wherein the connection arm pushes the plunger to a side of the second position through the turning member when the connection arm is changed from the bent posture to the extended posture.

* * * * *